United States Patent [19]

Kinsley, Jr.

[11] Patent Number: 5,028,465
[45] Date of Patent: Jul. 2, 1991

[54] HYDROENTANGLED COMPOSITE FILTER ELEMENT

[75] Inventor: Homan B. Kinsley, Jr., Powhatan, Va.

[73] Assignee: James River Corporation, Richmond, Va.

[21] Appl. No.: 325,894

[22] Filed: Mar. 20, 1989

[51] Int. Cl.$^5$ ............................ B32B 5/02; B32B 5/08
[52] U.S. Cl. .............................. 428/36.3; 210/494.1;
210/497.01; 210/497.1; 210/505; 210/508;
428/36.1; 428/36.4; 428/36.8; 428/36.9;
428/137; 428/138; 428/212; 428/220; 428/234;
428/235; 428/284; 428/906
[58] Field of Search .............. 428/36.1, 36.3, 36.4,
428/36.8, 36.9, 212, 284, 287, 298, 299, 903,
220; 210/494.1, 497.01, 497.1, 505, 508, 137,
138, 906

[56] References Cited

U.S. PATENT DOCUMENTS

| | | | |
|---|---|---|---|
| 2,862,251 | 12/1958 | Kalwartes | 428/131 |
| 3,485,706 | 12/1969 | Evans | 428/232 |
| 3,494,821 | 2/1970 | Evans | 428/224 |
| 4,032,457 | 6/1977 | Matchett | 210/505 |
| 4,048,075 | 9/1977 | Colvin et al. | 210/494.1 |
| 4,081,582 | 3/1978 | Butterworth et al. | 428/284 |
| 4,102,785 | 7/1978 | Head et al. | 210/505 |
| 4,104,170 | 8/1978 | Nedza | 210/505 |
| 4,160,059 | 7/1979 | Samejima | 428/288 |
| 4,331,730 | 5/1982 | Sorenson | 428/286 |
| 4,361,619 | 11/1982 | Forsten et al. | 428/234 |
| 4,531,957 | 6/1985 | Malik | 428/235 |
| 4,536,439 | 8/1985 | Forster | 428/299 |
| 4,612,237 | 9/1986 | Frankenburg | 428/286 |
| 4,661,255 | 4/1987 | Aumann et al. | 210/505 |
| 4,705,712 | 11/1987 | Cashaw et al. | 428/299 |
| 4,808,467 | 2/1989 | Suskind et al. | 428/287 |
| 4,840,838 | 6/1989 | Wyss | 428/299 |

FOREIGN PATENT DOCUMENTS 0127851 12/1984 European Pat. Off. ............ 428/299

Primary Examiner—Patrick J. Ryan
Assistant Examiner—Archene A. Turner
Attorney, Agent, or Firm—Burns, Doane, Swecker & Mathis

[57] ABSTRACT

A high performance filter element is provided, which filter element comprises a wound sheet of apertured material formed by hydroentangling webs of disparate fibrous materials. In a most preferred embodiment, the fibrous material disposed upstream of fluid flow should have a fiber diameter smaller than that disposed downstream.

19 Claims, 1 Drawing Sheet

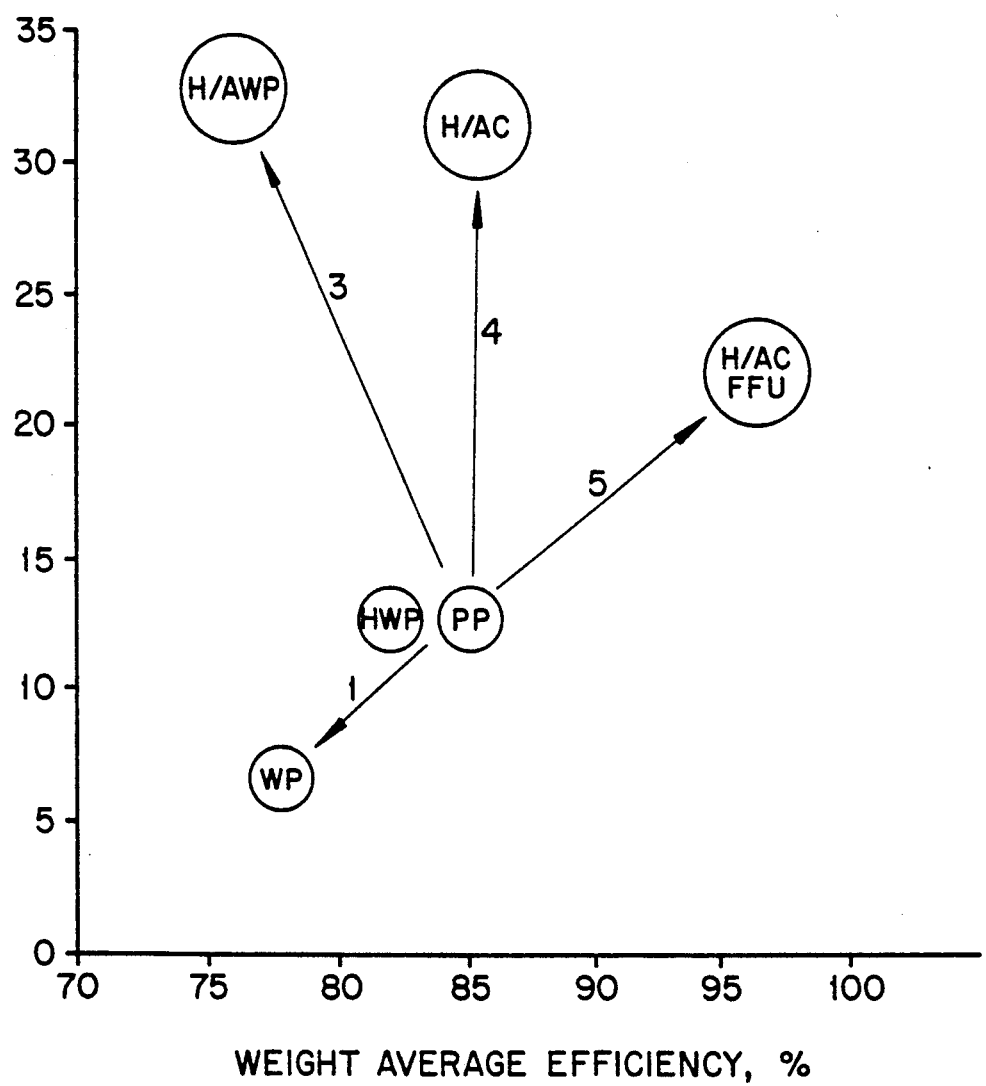

HYDROENTANGLED COMPOSITE FILTER ELEMENT

BACKGROUND OF THE INVENTION

The present invention relates to a high performance filter element. The filter element according to the present invention is particularly useful as the principal component in an automotive lube oil filter assembly.

The performance of filter elements for use in automotive lube oil filter assemblies is evaluated based on a number of parameters. These include (1) the grams of test dust that can be filtered per pound of filter material, (2) the grams of test dust that can be filtered by a given filter cartridge and (3) the weight average efficiency of the filter material. The weight average efficiency (WAE) is the percentage of suspended solids retained by the filter material relative to total solids suspended in the fluid filtered. Parameter (2) above is often simply called the "capacity" of the filter cartridge.

It will be appreciated that the ideal filter will deliver both high efficiency and high capacity, but that these typically are competing parameters. That is, the higher a filter's efficiency, the sooner it will become clogged and thus the lower its capacity. Conversely, the higher a filter's capacity, the coarser it must be to enjoy a long life without clogging, and thus the more particulate that will pass through. Nonetheless, it is possible to design filter elements that have both higher capacity and higher efficiency than competing products. In this regard, however, it is very difficult to predict in advance what combinations of materials, processing conditions and physical characteristics will deliver a filter element having particularly advantageous performance parameters.

Hydroentangling is a process for producing nonwoven fabrics by impinging a plurality of fine columnar streams of water onto a fibrous web carried by an apertured or patterned conveying means. There is thus produced a felt-like material in which even relatively short fibers can be mechanically intertwined without the damaging effects of needling. One example of a patent describing hydroentangling is U.S. Pat. No. 3,485,706, the disclosure of which is hereby expressly incorporated by reference, to the extent not inconsistent herewith. In this patent, an apertured hydroentangled fabric is produced wherein the apertures in the fabric correspond to knuckles in the wire screen used to support and convey the fibrous web. Patterned supporting means are disclosed for imparting to the resulting hydroentangled fabric a desired ornamental appearance.

Similarly, U.S. Pat. No. 2,862,251 discloses the formation of a hydroentangled/apertured gauze-like web (col. 10, lines 17-25). At column 37, line 59 of this patent, it is suggested that the products produced thereby may be useful as filter materials.

U.S. Pat. No. 4,612,237 applies hydroentangling technology to produce filter media. Specifically, this patent discloses a hydroentangled felt comprising a uniformly dispersed sheet-like structure containing poly(tetrafluoroethylene) fibers and glass fibers hydraulically entangled onto a supporting scrim.

SUMMARY OF THE INVENTION

There has now been developed a filter element that delivers surprisingly superior performance in both capacity and efficiency. The filter element of the present invention is made by helically winding a sheet of apertured material formed by hydroentangling superposed webs of disparate fibrous materials, wherein one of the superposed webs has a fiber diameter substantially smaller than that of a contiguous superposed web. In a most preferred embodiment, the web having the smaller diameter fibers is disposed upstream of the flow through the web.

BRIEF DESCRIPTION OF THE DRAWING

The FIGURE of the drawing graphically depicts the performance of various filters in terms of filter efficiency and filter element dust capacity.

DETAILED DESCRIPTION OF PREFERRED EMBODIMENTS ACCORDING TO THE INVENTION

The filter elements according to the present invention were designed for removal of particulate from liquid, or specifically to remove dust from lube oil.

In the course of the studies that led to the development of the present invention, it was observed generally that filter efficiency is related to fiber coarseness, filter capacity is related to the void fraction of the paper used to produce the filter, and that only 5% of the voids in conventional filter paper are useful for holding dust.

The filter element of the present invention, however, provides one with an element that delivers surprisingly superior performance in both capacity and efficiency. This is realized by helically winding a sheet of apertured material around a center tube. The apertured material is formed by hydroentangling superposed webs of disparate fibrous materials, with one of the superposed webs have a fiber diameter substantially smaller than that of the other For example, the web having the smaller fiber diameter can be formed from fibers having a diameter ranging from submicron (less than one micron) to 5 micrometers, with the contiguous web being formed from fibers having a diameter ranging from 5 to 50 micrometers. In a preferred embodiment, the web having a smaller fiber diameter is formed from a polymeric material, and preferably a melt-blown polymer, such as a polyester or polypropylene, and the web having a larger fiber diameter is formed from cellulosic fibers.

In a preferred embodiment of the present invention, the filter is formed by hydroentangling a web of glass fiber or polyester (Polyweb ®) underlying a sheet of unsaturated base paper, the superposed webs being supported by a relatively large mesh screen and subjected to relatively severe hydroentangling conditions. After hydroentangling, the filter media is formed into a filter element by helically or convolutely winding it a plurality of times around a center tube. It has been found that a filter element formed in this manner offers surprisingly superior performance relative to conventional pleated filter configurations.

As demonstrated by the following experimental runs, especially advantageous performance is obtained when the filter element is wound such that the side of the hydroentangled sheet with the smaller diameter fibers is disposed upstream of the fluid (e.g., oil) flow through the filter element.

The following materials were employed in the experiments detailed hereinafter:

HB454 paper (produced by James River Corp., a paper formed from softwood fibers having a diameter of about 45 micrometers);

HB542 paper, a paper formed from a mixture of softwood (45 micrometers diameter), hardwood (25 micrometers diameter), and glass microfiber (Evans code 506, 0.7 micrometer diameter);

Polyweb ® 1072 (a fibrous polyester material produced by James River Corp., having a diameter of about 1 to 2 micrometers);

108B Glass Microfiber (a glass fiber produced by Manville Corp., having a diameter of about 1.6 micrometers);

The 15g/square yard carded web is made of 1.5 denier, 1.5 inch polyethylene terephthalate fibers. It is made by James River Nonwovens.

The hydroentangling apparatus employed is conventional in nature, comprising a clean filtered water supply, a high pressure pump, an in line high pressure filter, a hydroentangling manifold, a backing screen, and a vacuum dewatering system. The manifold is the heart of the system. There are 40 nozzles per inch of width, with each nozzle having a circular cross section of 0.003 inch diameter. The nozzles are held about one inch above the surface of the material which is to be hydroentangled.

The screen used to support the fibrous webs was 13×20 U S. mesh. For comparison purposes, there was also used a screen of 100 U.S. mesh.

It was found that the filters having the best overall capacity and efficiency performance resulted from a delicate balance of starting materials, hydroentangling conditions, and the number of times the hydroentangled sheet was wrapped around the center tube.

Typical specifications for conventional high capacity pleated paper would be 325 in.$^2$ of paper at a basis weight of 125 lb/3000 ft.$^2$ or 0.094 lb paper/filter cartridge, having about fifteen hours of life at a 2.5 g/hr dust feed rate and delivering a WAE of 85%. This translates to a capacity of 31.9 g. of dust per filter cartridge or 336 g. of dust per pound of filter material, for a typical pleated paper filter.

A pleated cartridge made of HB454 will deliver about 12 grams of capacity at about 85% efficiency.

EXAMPLE 1: (comparative)

146 in.$^2$ of HT454 filter paper base, weighing 9.9 g., was wound four times around a center tube having a diameter of 2.4 in. The performance of this filter element was tested according to the procedures of SAE J806B, which uses a spin-on filter. The pleated paper used in the conventional filter assembly was replaced by the above paper wound four times around the center tube. The results of the test, expressed in greater detail in Table 1, showed this filter element to have a capacity of 3.9 g. per cartridge or 177 g. of dust/ pound of filter material, at a WAE of 81.1%. In short, this example showed helically wound paper to be inferior to pleated paper in all respects.

EXAMPLE 2: (comparative)

The procedure of Example 1 was repeated, but enough paper was used to produce six wraps around the center tube. The resulting filter delivered a capacity of 6.5 g. per cartridge or 207 g. of dust per pound of filter material, but at a WAE of only 76%. Other characteristics of this filter are set forth in Table 1.

EXAMPLE 3: (comparative)

The procedure of Example 2 was repeated, but this time the paper was first subjected to hydroentangling for the number of times at each of the fluid pressures indicated in Table 1. The backing screen used for hydroentangling the paper was 100 mesh, which is finer than is preferred for use according to the invention. As shown in Table 1, this hydroentangled wound paper filter medium delivered 11.9 g. of capacity per cartridge or 368 g. of dust capacity per pound of filter medium, at a WAE of 83%.

EXAMPLE 4: (comparative)

The procedure of Example 3 was repeated, but the backing screen used during the hydroentangling treatment was 13×20 mesh, the number of passes/pressure of the hydroentangling apparatus was different, and the number of wraps around the center tube was increased to nine. The filter thus produced was apertured owing to the screen mesh size and hydroentangling conditions. It did not plug during the time allowed for the test (20 hours). The capacity at the end of 20 hours was 42+g./filter cartridge or 900+g./lb filter medium, at a WAE of 73.8%

EXAMPLE 5: (comparative)

The procedure of Example 4 was repeated, except that the hydroentangled paper was wrapped 12 times around the center tube rather than nine. As a result, the filter had not plugged after a testing ("final time") of over 60 hours, at which time the capacity was 95+g. per cartridge or 1900+g. of dust retained per pound of filter medium. Weight average efficiency, on the other hand, dropped to 63%.

EXAMPLE 6: (comparative)

The procedure of Example 5 was repeated, except that the hydroentangled paper was wrapped 15 times around the center tube. The results are shown in Table 1.

In the following Examples, a smaller diameter fibrous material was investigated, for the purpose of increasing the efficiency of the hydroentangled/apertured filter media. Polyweb ® 1072 was first tried. It was found that a single wrap of the Polyweb ® alone plugs instantly, producing no capacity.

EXAMPLE 7: (comparative)

Polyweb ® 1072 was hydroentangled on the 13×20 mesh screen under the conditions set forth in Table 1. The more severe pressure and more repeated number of passes produced a structure referred to as "hard apertured." The resulting hydroentangled/apertured Polyweb ® was wrapped twelve times around a center tube. The resulting filter delivered a capacity of 30.2 g. of dust per cartridge (or 841 g. of dust per filter element) at a WAE of 85.2%, and plugged after 14.1 hours.

EXAMPLE 8:

In this example, a composite of Polyweb ® and HB454 filter paper was hydroentangled. The hydroentangling conditions are given in Table 1. The resulting filter material was wrapped four times around the center tube, and the filter thus produced provided a capacity of 3.8 g. per cartridge (117 g. per pound of filter material) at a very high efficiency of 96%. It plugged after 1.5 hours.

EXAMPLE 9:

The procedure of Example 8 was repeated, except that more hydroentangling passes were executed at the high fluid pressure, and the resulting filter material was wrapped eight times around the center tube. The resulting filter did not plug in the 20 hours allotted for the test, and had a capacity of 43 + g. per cartridge or 680 + g. of dust per pound of filter media. Even at this high a capacity, the WAE was a very respectable 84.6%. Compared to the performance of pleated HB454 alone (12 g. of capacity at 85% WAE), it was evident that a breakthrough had been made.

EXAMPLES 10-24:

The procedure of Example 9 was followed in these Examples, with one or more of the processing and testing conditions being varied each time as indicated in Table 1. The parameters varied included: # of wraps around the center tube; # of passes beneath and degree of pressure of the hydroentangling apparatus; which of the materials (paper or Polyweb ®) was disposed upstream of the oil flow; and type of paper used. The results of these Examples, set forth in Table 1, demonstrate that higher efficiency could be obtained by forming the filter such that the side of the hydroentangled material having the smaller diameter fiber (i.e. Polyweb ® or carded web) was disposed upstream of the oil flow through the filter. Examples 12, 15 and 16 show remarkably high efficiency at very usefully high levels of capacity. Conversely, Examples 11, 13 and 18 show extraordinarily high efficiency at levels of capacity that remain quite acceptable for commercial application.

EXAMPLES 25-29:

These examples chronicle experiments wherein carded web was used as the top fabric and either paper or 108B was used as the bottom fabric. The results (see Table 1) show that such combinations are useful, but did not produce as dramatic results as those given above.

The FIGURE of the Drawing further illustrates the surprising and significant advantages realized in the practice of the present invention. More specifically, the FIGURE shows a graph of the performance of various filters, with the filter efficiency on the "x" axis and the filter element dust capacity on the "y" axis. The most desirable filter would be one with the highest possible efficiency and the highest capacity. In other words, the best filters would occupy the north east corner of the graph.

The starting point for comparison purposes is a pleated paper (PP) filter. The performance of a filter made by simply winding the paper around a center tube is shown to be not as good as the original. Arrow #1 shows that the wound paper (WP) filter is lower in both capacity and efficiency than the pleated paper filter. If the paper is hydroentangled prior to being wound around the center tube, however, the performance returns to the starting point. This in itself is quite significant since the pleated paper element had been saturated with a phenolic resin, "B - staged", corrugated, pleated, and cured while the hydroentangled wound paper (HWP) element had been exposed to none of these costly steps.

When the same paper was hydroentangled and apertured before being wound around the center tube (H/AWP), it developed a much higher dust capacity when tested as a lube oil filter. The aperturing decreased the efficiency, as is noted by arrow #3 in the FIGURE.

The decrease in efficiency was overcome by combining the paper web with a melt blown web of polyester fine fiber.

TABLE 1

| Ex. No. | Top Fabric | Bottom Fabric | Backing Screen Mesh | Passes/ Pressure (psig) | Passes/ Pressure (psig) | Passes/ Pressure (psig) | Passes/ Pressure (psig) | # of Wraps |
| --- | --- | --- | --- | --- | --- | --- | --- | --- |
| 1 | HB454 | none | — | — | — | — | — | 4 |
| 2 | HB454 | none | — | — | — | — | — | 6 |
| 3 | HB454 | none | 100 | 2/200 | 6/800 | — | — | 6 |
| 4 | HB454 | none | 13 × 20 | 2/200 | 4/400 | 4/800 | — | 9 |
| 5 | HB454 | none | 13 × 20 | 2/200 | 4/400 | 4/800 | — | 12 |
| 6 | HB454 | none | 13 × 20 | 2/200 | 4/400 | 4/800 | — | 15 |
| 7 | PW1072 | none | 13 × 20 | 2/200 | 4/800 | 8/1200 | — | 12.3 |
| 8 | PW1072 | HB454 | 13 × 20 | 2/200 | 4/800 | 4/1400 | — | 4 |
| 9 | PW1072 | HB454 | 13 × 20 | 2/200 | 4/800 | 4/1400 | — | 8 |
| 10 | HB542 | PW1072 | 13 × 20 | 2/200 | 6/1000 | 22/1800 | — | 8 |
| 11 | HB542 | PW1072 | 13 × 20 | 2/200 | 6/1000 | 10/1800 | — | 8 |
| 12 | HB542 | PW1072 | 13 × 20 | 2/200 | 6/1000 | 10/1800 | — | 8 |
| 13 | HB542 | PW1072 | 13 × 20 | 2/200 | 6/1000 | 10/1800 | — | 6 |
| 14 | HB542 | PW1072 | 13 × 20 | 2/200 | 6/1000 | 10/1800 | — | 6 |
| 15 | HB454 | PW1072 | 13 × 20 | 2/200 | 4/800 | 6/1600 | — | 8 |
| 16 | HB454 | PW1072 | 13 × 20 | 2/200 | 4/800 | 6/1600 | — | 8 |
| 17 | HB454 | PW1072 | 13 × 20 | 2/200 | 4/800 | 6/1600 | — | 6 |
| 18 | HB454 | PW1072 | 13 × 20 | 2/200 | 4/800 | 6/1600 | — | 6 |
| 19 | HB454 | PW1072 | 13 × 20 | 2/200 | 4/800 | 4/1400 | 10/1800 | 6 |
| 20 | HB454 | PW1072 | 13 × 20 | 2/200 | 4/800 | 6/1600 | — | 6 |
| 21 | HB454 | PW1072 | 13 × 20 | 2/200 | 4/800 | 4/1400 | 10/1800 | 6 |
| 22 | HB454 | PW1072 | 13 × 20 | 2/200 | 4/800 | 4/1400 | 10/1800 | 6 |
| 23 | HB454 | PW1072 | 13 × 20 | 2/200 | 4/800 | 4/1400 | 10/1800 | 8 |
| 24 | HB454 | PW1072 | 13 × 20 | 2/200 | 4/800 | 4/1400 | 10/1800 | 8 |
| 25 | Card | PW1072 | 100 | 2/200 | 4/400 | 4/800 | — | 6 |
| 26 | Card | PW1072 | 13 × 20 | 2/200 | 4/400 | 4/800 | — | 9 |
| 27 | Card | PW1072 | 13 × 20 | 2/200 | 4/400 | 4/800 | — | 18 |
| 28 | Card | PW1072 | 13 × 20 | 2/200 | 4/800 | 4/1600 | — | 15 |
| 29 | Card | PW1072 | 13 × 20 | 2/200 | 4/800 | 4/1600 | — | 10 |

| Ex. No. | Fabric Up | Fabric Area (in.$^2$) | Fabric Mass (g) | Initial Restriction (%) | Final Time (hr) | Capacity (g per Element) | Capacity (g/lb) | Capacity (mg/in$^2$) | WAE |
| --- | --- | --- | --- | --- | --- | --- | --- | --- | --- |
| 1 | HB454 | 146 | 9.9 | 5.4 | 1.9 | 3.9 | 178 | 27 | 81 |
| 2 | HB454 | 214 | 14.2 | 6.8 | 3.3 | 6.5 | 207 | 30 | 76 |

TABLE 1-continued

|    |        |       |      |     |       |       |        |       |      |
|----|--------|-------|------|-----|-------|-------|--------|-------|------|
| 3  | HB454  | 217   | 14.6 | 4.8 | 5.6   | 11.9  | 368    | 55    | 83   |
| 4  | HB454  | 354   | 21.3 | 4.3 | 22+   | 42+   | 900+   | 120+  | 74   |
| 5  | HB454  | 370   | 22.3 | 8.8 | 60+   | 95+   | 1900+  | 250+  | 63   |
| 6  | HB454  | 452.8 | 23.2 | 4.2 | 39.3  | 75.0  | 1467   | 166.0 | 74.3 |
| 7  | PW1072 | 458   | 16.3 | 8.5 | 14.1  | 30.2  | 841.0  | 65.9  | 85.2 |
| 8  | PW1072 | 146   | 14.6 | 6.4 | 1.5   | 3.8   | 117.0  | 25.8  | 95.6 |
| 9  | PW1072 | 316   | 28.7 | 4.5 | 20+   | 43+   | 683+   | 137+  | 84.6 |
| 10 | HB542  | 304   | 38.2 | *   | 22+   | 43+   | 511+   | 141+  | 81   |
| 11 | HB542  | 306   | 42.5 | 6.8 | 45.1  | 92.0  | 982.0  | 301.0 | 87.6 |
| 12 | PW1072 | 309   | 43.6 | 6.4 | 12.3  | 29.2  | 304.0  | 94.3  | 95.7 |
| 13 | PW1072 | 234   | 30.6 | 6.8 | 39.4  | 71.6  | *      | *     | 85.0 |
| 14 | HB542  | 223   | 27.9 | 5.5 | 40.0  | 65.8  | 1073.0 | 295.0 | 66.4 |
| 15 | PW1072 | 203   | 33.6 | 7.0 | 9.4   | 22.1  | 299.0  | 73.2  | 95.3 |
| 16 | HB454  | 308.9 | 33.5 | 6.6 | 10.1  | 23.1  | 313.0  | 74.9  | 92.3 |
| 17 | PW1072 | 226   | 24.9 | 7.5 | 8.8   | 18.9  | 343.0  | 83.4  | 86.4 |
| 18 | PW1072 | 226   | 23.9 | 7.1 | 20.0  | 41.3  | 784.0  | 183.0 | 83.4 |
| 19 | HB454  | 222.8 | 28.0 | 7.0 | 40+   | 61.6+ | 1001+  | 277+  | 62.2 |
| 20 | HB454  | 222.8 | 30.0 | 6.4 | 36+   | 70+   | 1060+  | 314+  | 78.5 |
| 21 | PW1072 | 226.8 | 23.0 | 6.3 | 7+    | 14+   | 280+   | 63+   | 74.3 |
| 22 | HB454  | 223.1 | 20.9 | 6.4 | 20+   | 32+   | 701+   | 145+  | 65.3 |
| 23 | HB454  | 314.8 | 31.4 | 6.2 | 18.5+ | 33.5+ | 484.7+ | 107+  | 73.1 |
| 24 | HB454  | 321.4 | 31.0 | 6.0 | 20+   | 36.6+ | 537+   | 114+  | 73.9 |
| 25 | Card   | 219   | 17.4 | 4.9 | 3.0   | 6.9   | 181    | 32    | 91   |
| 26 | Card   | 341   | 25.6 | 5.3 | 13.6  | 30.0  | 528    | 87    | 87   |
| 27 | Card   | 597   | 45.3 | 5.5 | 14.7  | 34.0  | 335    | 56    | 89   |
| 28 | Card   | 586   | 32.0 | 9.2 | 7.9   | 19.2  | 271    | 33    | 95   |
| 29 | Card   | 357   | 17.5 | 6.2 | 5.3   | 12.5  | 323    | 35    | 91   |

This composite was hydroentangled, apertured and wound around the center tube to form element H/AC. This element had the same efficiency as the starting element (PP) but it is much better in dust capacity, as shown by arrow #4.

The final and most significant improvement occurred when the hydroentangled and apertured composite web was wound around the center tube with the fine fiber side upstream to the oil flow (H/AC FFU). This element possessed both superior dust capacity and efficiency. Arrow #5 is pointed in the most desirable direction.

While the present invention has been described in connection with various preferred embodiments thereof, it will be appreciated that it should not be construed to be limited thereby. Modifications remain possible, without departing from the scope and spirit of the appended claims.

What is claimed is:

1. A high performance filter element, comprising a helically wound sheet of apertured material formed by hydroentangling superposed webs of disparate fibrous materials, one of said superposed webs having a fiber diameter substantially smaller than that of a contiguous superposed web.

2. A filter assembly comprising a filter element according to claim 1, said assembly being adapted to filter a fluid travelling in a given direction relative to the axis of said filter element, said filter element being oriented within said assembly such that said web having a smaller fiber diameter is disposed upstream of said contiguous web.

3. A filter assembly according to claim 2, wherein said given direction is radially inwardly of said filter element.

4. A filter assembly according to claim 2, wherein said given direction is radially outwardly of said filter element.

5. A filter element according to claim 1, comprising a total of two of said superposed webs.

6. A filter element according to claim 5, wherein said web having a smaller fiber diameter is formed from a polymeric material and said web having a larger fiber diameter is formed from cellulosic fibers.

7. A filter element according to claim 6, wherein said web having a smaller fiber diameter is formed from melt blown polyester.

8. A filter element according to claim 6, wherein said web having a smaller fiber diameter is formed from melt blown polypropylene.

9. A filter element according to claim 1, wherein said web having a smaller fiber diameter is formed from melt blown polyester or polypropylene.

10. A filter element according to claim 1, wherein said web having a smaller fiber diameter is formed from a microfiber material.

11. A filter element according to claim 1, wherein said web having a smaller fiber diameter is formed from fibers having a diameter ranging from submicron to 5 micrometers, and said contiguous web is formed from fibers having a diameter ranging from 5 to 50 micrometers.

12. A filter element according to claim 2, wherein said web having a smaller fiber diameter is formed from fibers having a diameter ranging from submicron to 5 micrometers, and said contiguous web is formed from fibers having a diameter ranging from 5 to 50 micrometers.

13. A filter element according to claim 6, wherein said polymeric material web is formed from fibers having a diameter of submicron to 5 micrometers and said cellulosic web is formed from fibers having a diameter of 5 to 50 micrometers.

14. A filter element according to claim 2, comprising a total of two of said superposed webs, wherein said web having a smaller fiber diameter is formed from a polymeric material and said web having a larger fiber diameter is formed from cellulosic fibers.

15. A filter element according to claim 14, wherein said web having a smaller fiber diameter is formed from fibers having a diameter ranging from submicron to 5 micrometers, and said contiguous web is formed from fibers having a diameter ranging from 5 to 50 micrometers.

16. A filter element according to claim 2, comprising a total of two superposed webs, wherein said web having a smaller fiber diameter is formed from melt blown polyester or melt blown polypropylene, and said web having a larger fiber diameter is formed from cellulosic fibers.

17. A filter element according to claim 16, wherein said web having a smaller fiber diameter is formed from fibers having a diameter ranging from submicron to 5 micrometers, and said contiguous web is formed from fibers having a diameter ranging from 5 to 50 micrometers.

18. A filter element according to claim 1, wherein said superposed webs are hydroentangled on a screen having a linear mesh ranging from 5 to 40×10 to 50.

19. A filter element according to claim 1, wherein said helically wound sheet is wound a total of at least three revolutions.

* * * * *